United States Patent Office 3,162,947
Patented Dec. 29, 1964

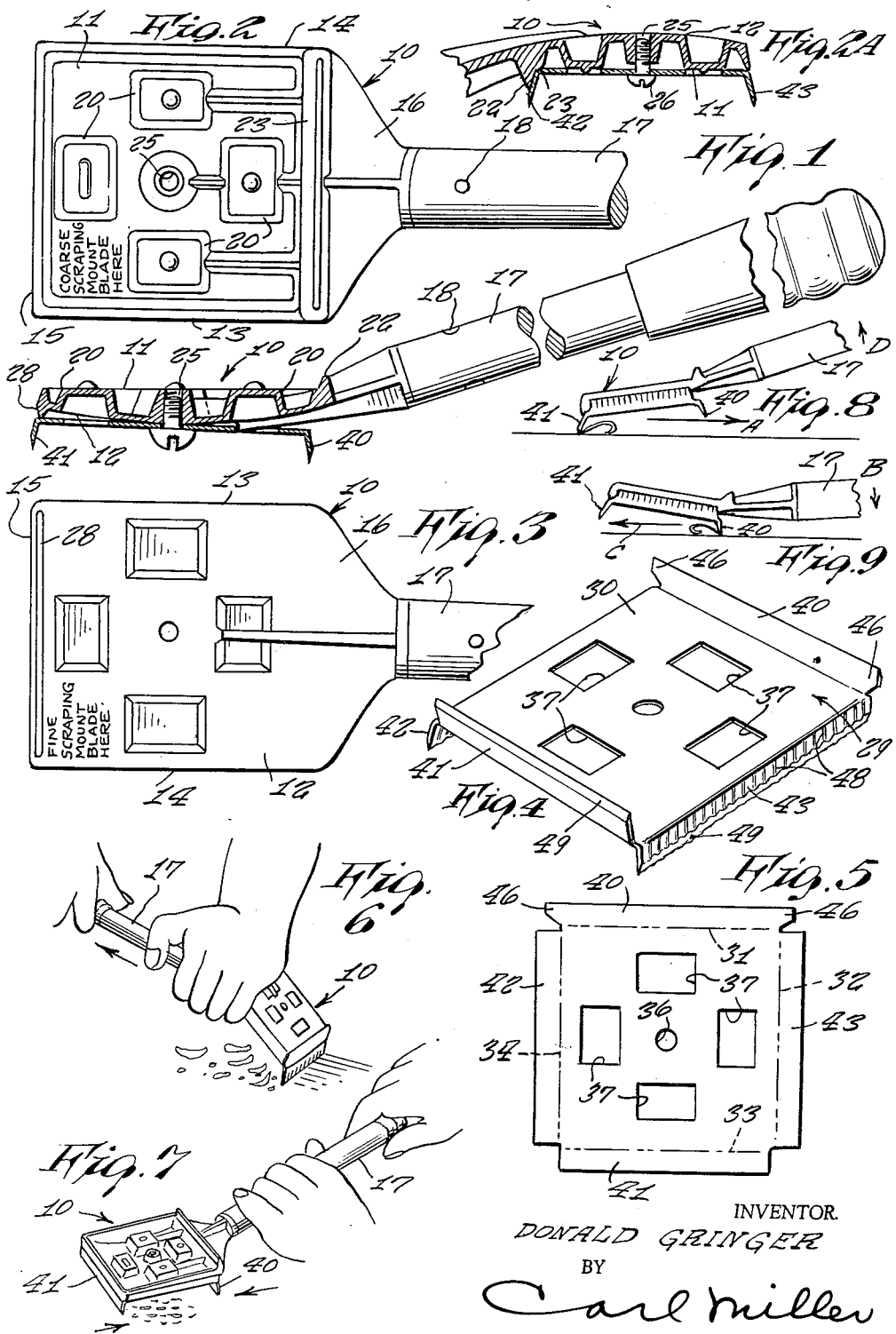

3,162,947
FOUR EDGE HAND SCRAPER
Donald Gringer, Bronx, N.Y., assignor to Allway Mfg. Co., Inc., New York, N.Y., a corporation of New York
Filed Mar. 18, 1963, Ser. No. 265,657
6 Claims. (Cl. 30—171)

This invention relates to improvements in a hand scraper device.

The main object of the invention is to provide a hand scraper that will function for fine and coarse scraping.

Another object of the invention is to provide a blade support having upper and lower blade receiving surfaces with the blade support angularly related to a handle secured thereto such that with a scraping blade fitted to one support surface, the scraper device will be operable for fine scraping and with the scraping blade fitted to the other support surface, the scraper device will be operable for coarse scraping.

A further object of the invention is to provide an interlocking engagement of the scraper blade on each of the upper and lower surfaces of the blade support and including a removable fastener for securing the scraper blade to a selected one of each said surface.

A still further object of this invention is to provide a scraping blade of substantially square formation having fine or shallow scraping edges formed at opposed ends on one side of the scraper blade and upstanding therefrom, and coarse or deep scraping edges formed at the other opposed ends on the other side of the scraper blade and upstanding therefrom such that by mounting the scraper blade in any of four positions, on either of the upper or lower surfaces of the blade support, eight choices of scraping may be obtained.

Still another object of the invention is to place the edges of the scraping blade to permit scraping in corners.

Another object of this invention relates to the angle of the blade support to the handle such that when the scraping blade is positioned for fine scraping, the blade support will be so related to the work that the blade can scrape in both directions, first by pulling, using the foremost edge, then rocking and pushing, using the opposed rearmost edges, and so on, thus eliminating lost motion.

It is also an object of this invention to have a hand scraper of the character indicated, which is of simple construction and simple to use, in order to provide a convenient and reliable tool that will endure service use.

Other objects, purposes and advantages of the invention will appear in further detail as the specification proceeds, references being now had to the accompanying drawing wherein:

FIGURE 1 is a side view of the hand scraper with parts thereof shown in section and showing the blade mounted for fine scraping.

FIGURE 2 is a fragmentary top view of the blade support portion.

FIGURE 2A is a detail longitudinal sectional view of the blade support in the reverse position from that shown in FIGURE 1 with the blade mounted thereon for coarse scraping.

FIGURE 3 is a fragmentary bottom view of the blade support portion.

FIGURE 4 is a perspective view of the scraping blade.

FIGURE 5 is a plan view of a scraping blade blank.

FIGURE 6 shows the hand scraper in operative use for coarse scraping.

FIGURE 7 shows the hand scraper in operative use for fine scraping.

FIGURES 8 and 9 show the hand scraper with scraping blade mounted for fine scraping illustrating respectively the sequential pull, work, push operation thereof.

Throughout the views, the same reference numerals indicate the same or like parts and features.

In constructing the invention, there is provided a blade support 10 formed as a casting comprising a top surface 11, a bottom surface 12, parallel sides 13—14, and a front side 15. The rear side of the casting, converges as at 16 to provide a shank (not shown) that has a press fit within the handle 17 in the manner well known, and is secured thereto by the rivet 18. As will be seen in FIGURE 1, the handle 17 extends at an angle to the blade support 10 for a purpose to be hereinafter described. The blade support 10 along the sides 13, 14 and 15, forms substantially the three sides of a square. Formed in the top surface 11 are four upstanding tapered rectangular bosses 20 arranged in pairs in the manner shown. Extending also on the top surface 11 adjacent the converging side 16 is an upstanding tapered ridge 22 parallel to the side 15 and provided with a shoulder or seat 23. The bosses 20 are preferably hollow and open into the bottom surface 12. Centrally diagnosed in the blade support is a threaded opening 25 to receive a scraper blade retaining screw 26. Also formed on the bottom surface 12 of the blade support 10 adjacent to the side 15, is a seating ridge 28 for the scraper blade.

The scraper blade 29 shown in perspective in FIGURE 4, is formed from a sheet metal blank of suitable steel or alloy steel having the configuration shown in FIGURE 5. The body 30 of the scraper blade 29 is flat and is formed square as indicated by the dotted fold lines 31, 32, 33, 34. Formed in the body of the scraper blade is a central screw receiving opening 36 and four rectangular openings 37 in size and arrangement complemental to the size and arrangement of the bosses 20 formed in the blade support 10.

Extending along each side of the scraper blade 29 is a scraping edge. The fine scraping edges 40, 41, are in opposed relation as also the coarse scraping edges 42, 43. All of the scraping edges are of the same length and have square ends with the exception of the fine scraping edge 40 whose opposed ends 45, 46, flare outwardly to facilitate scraping in corners. The coarse scraping edges 42, 43, are each provided with corrugations 48 to impart strength and rigidity to the same. In the final form of the scraper blade 29 (see FIGURE 4), the opposed fine scraping edges 40, 41, are diagnosed on one side of the scraper blade body 30 in parallel upstanding relation along the fold lines 31, 33, while the opposed coarse scraping edges 42, 43, are diagnosed on the other side of the scraper blade body 30 in parallel upstanding relation thereto along the fold lines 32, 34. As will be noted, each of the scraper blade edges are beveled outwardly with relation to the scraper blade body 30 as at 49.

In use of the hand scraper, the scraper blade 29 may be seated either on the top surface 11 of the blade support 10, or on the bottom surface 12 thereof, in each instance, being secured in position by the screw 26, when seated on the bottom surface 12 for fine scraping (see FIGURE 3). The body 30 of the scraping blade will seat on the ridge 28, the edges of the blade support sides 13, 14, and the center portion of the blade support surrounding the threaded opening 25 (see FIGURE 1), with the fine scraping edges 40, 41, directed downwardly, and the coarse scraping edges 42, 43, extending upwardly in engagement with the blade support sides 13, 14. With the screw 26 in place, this coaction of the scraping edges 42, 43, with the sides of the blade support will insure an immovable assembly of the scraper blade with the blade support. The same vibration will exist when the scraping blade is reversed and seated on the top surface of the blade support for coarse scraping in which instance the scraping blade edges 40, 41, will engage the blade support sides 13, 14. In addition to this latter positioning of the scraping blade, the rear portion of the body 30 of the blade will seat in seat 23 with the rear scraping edge 42 engaging the rib 22 and the bosses 20 will engage with the openings 37 in the body 30 to give added support for the scraping blade, in order to obviate vibration and squeak when scraping hard surfaces.

FIGURE 6 illustrates the manner of using the hand scraper of this invention for coarse scraping. With the foremost scraping edge 43 in engagement with the work or object to be scraped, the blade support 10 serves as a support for one hand to provide the requisite pressure on the blade while the other hand holds the handle to manipulate the tool. In this use, both the handle 17 and the blade support are inclined downwardly, forming an inverted V.

FIGURES 7, 8 and 9 illustrate the hand scraper of the invention as used for fine scraping. In this use, the handle 17, in FIGURES 7 and 8, is inclined upwardly to be grasped by both hands to facilitate a pulling and pushing action. Thus, viewing FIGURE 8 with the front scraping edge in contact with the work and the handle 17 elevated to raise the rear scraping edge 40, the tool is pulled towards the operator in the direction of the arrow A. At the end of the stroke, the tool is rocked downwardly in the direction of the arrow B (see FIGURE 9), to bring the scraping edge 40 into contact with the work and raising the front scraping edge 41, whereupon the tool is then pushed forwardly in the direction of the arrow C, FIGURE 9. Repetition of the cycle of pull-push will be initiated by rocking the boat in the direction of the arrow D, FIGURE 8. This mode of operation of fine scraping eliminates lost motion.

The angle of the blade support casting 10 relative to the handle 17 will permit, as explained above, coarse or deep scraping in one position and fine or shallow scraping in the other position.

The flared-out corners 45, 46, of the scraping edge 40 will permit the easy scraping of corners in the work to be scraped in the manner readily apparent.

In the construction and manufacture of the hand scraper, variations may be resorted to, and parts and features may be modified or used without others within the scope of the appended claims.

Having now fully described my invention, I claim:

1. A hand scraper of the character described, comprising, a flat substantially square blade support having a top planar scraper blade seating surface and a bottom scraper blade seating surface, said blade support having parallel sides, a front side normal to said parallel sides and an elongated rear side, means securing a handle to said elongated rear side such as to dispose said handle at an angle relative to the plane of said top seating surface, a scraper blade having a substantially square flat body portion provided on one face thereof with a pair of opposed upwardly extending parallel scraping edges along one pair of opposed edges of said body portion and another pair of opposed downwardly extending parallel scraping edges along the other pair of opposed edges of said body portion, the distance between said scraping edges of each pair corresponding substantially to the width of said blade support such that when said scraping blade is selectively seated on either the top or bottom seating surface of the blade support, one of said pairs of scraping edges will be disposed in abutting engagement with the parallel sides of said blade support, and means detachably securing said scraper blade to said blade support.

2. The hand scraper of claim 1, wherein said top surface of said blade support is provided with a plurality of bosses, said body portion of said scraper blade having a like plurality of openings complementary in shape to said bosses to receive the same when said scraper blade is seated on said top surface.

3. The hand scraper of claim 2, wherein said blade support is provided with a central threaded opening, said body portion of the scraper blade having a central opening adapted to register with said threaded opening, and said means for detachably securing said scraper blade to said blade support comprising a threaded fastener for insertion through said central opening into the threaded opening of said blade support.

4. The hand scraper of claim 3, wherein a shouldered ridge is provided on said top surface adjacent the converging side of said blade support for seating engagement with an edge portion of the scraper blade.

5. The hand scraper of claim 1, wherein one pair of scraping edges are provided with transverse corrugations to form strengthening ribs whereby to permit the use of said scraping edges for coarse scraping, the other pair of scraping edges having flat and uninterrupted surfaces so as to permit the use thereof for shallow scraping.

6. The hand scraper of claim 5, wherein at least one of said shallow scraping edges is flared at each end thereof to facilitate use of said scraping edge for corner scraping.

References Cited by the Examiner

UNITED STATES PATENTS

| | | | |
|---|---|---|---|
| 1,195,297 | 8/16 | Vlchek | 30—169 |
| 1,463,745 | 7/23 | Layne | 30—171 |
| 2,286,190 | 6/42 | Abrahamsen | 30—171 |
| 2,783,537 | 3/57 | Gringer | 30—171 X |
| 3,121,899 | 2/64 | Lindmark | 30—171 X |

WILLIAM FELDMAN, *Primary Examiner.*